Mar. 20, 1923.
G. KNIGHT
GAUGE FOR PERFORATING MACHINES
Filed May 26, 1921
1,448,751
2 sheets-sheet 2
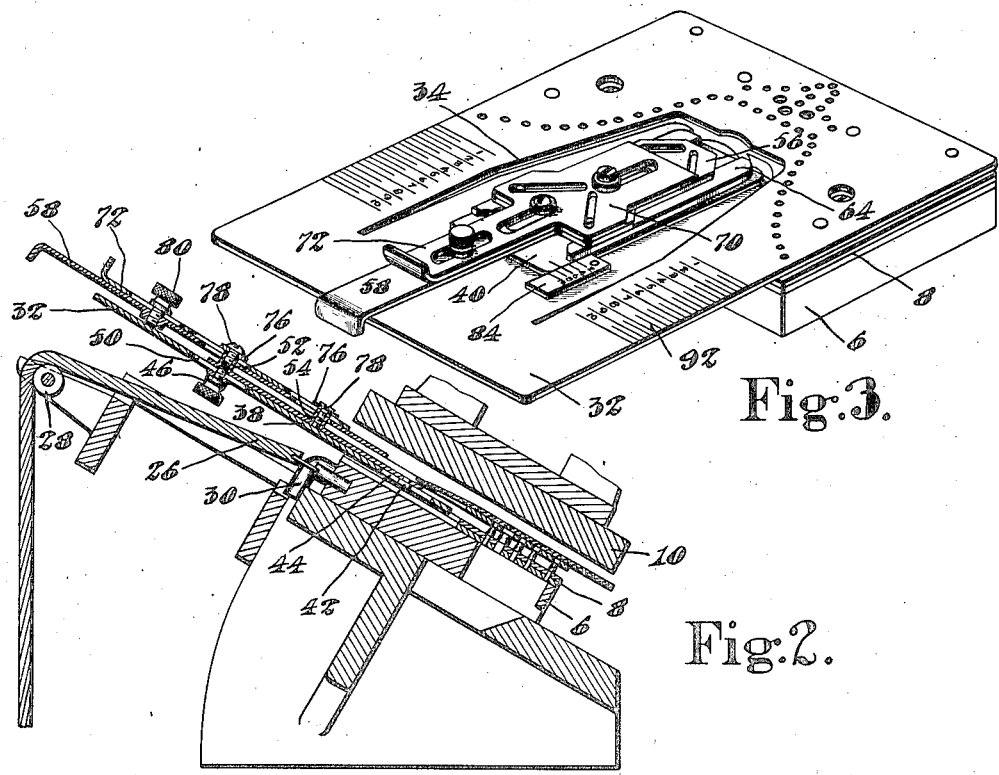
Fig.3.
Fig.2.
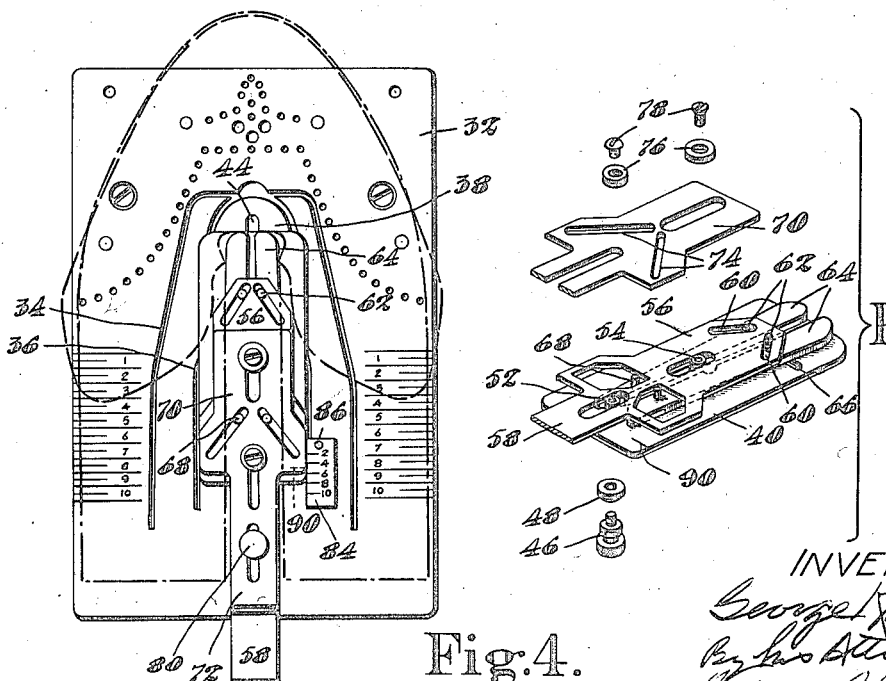
Fig.4.
Fig.5.
INVENTOR
George Knight Patented Mar. 20, 1923.

1,448,751

UNITED STATES PATENT OFFICE.

GEORGE KNIGHT, OF BROCKTON, MASSACHUSETTS.

GAUGE FOR PERFORATING MACHINES.

Application filed May 26, 1921. Serial No. 472,709.

*To all whom it may concern:*

Be it known that I, GEORGE KNIGHT, a citizen of the United States, residing at Brockton, in the county of Plymouth and State of Massachusetts, have invented certain Improvements in Gauges for Perforating Machines, of which the following description, in connection with the accompanying drawings, is a specification, like reference characters on the drawings indicating like parts in the several figures.

This invention relates to machines for operating on sheet material and is herein shown as embodied in a machine for perforating vamps.

It is usual, in the manufacture of boots and shoes, to ornament certain parts of the upper by punching designs therein with a gang punch. In punching some shoe parts, such as vamps and wing tips, difficulty is experienced in presenting the work to the punches in the proper manner because the vamps are not symmetrical and their outlines differ according to size and style and according to whether they are rights or lefts. There is also a variation in the distance at which the perforations are placed from the vamp throat, and a further variation in the pattern to be punched. The throats of the vamps are symmetrical, however, and this is taken advantage of in properly locating the vamps for punching.

An object of the invention, therefore, is to provide improved mechanism for positioning vamps to be perforated and so constructed that it can be effectively utilized to locate correctly and accurately, with respect to the perforating mechanism, vamps or wing tips of any and all sizes and styles.

In the illustrated construction, there is secured to a perforating die, a vamp supporting plate having a pair of gauge arms to enter the throat of the vamp, and, to cause these arms to fit the throats of vamps of any style, sliding cam plates are provided to open or close both ends of the gauge arms independently. When the gauge arms are thus set in accordance with a given shape of vamp it is desirable that they should thereafter be opened progressively to fit the different sizes and, as a further feature, clamping means is provided to secure the sliding cam plates together for simultaneous movement of both ends of the gauge arms. Since the longitudinal positions of the punchings with respect to the throats also vary with the different sizes, the gauge arms should have also a corresponding longitudinal adjustment. As shown, they are mounted on a gauge plate for bodily movement toward or from the punch, and a scale plate, graduated in sizes, co-operates with an index on the gauge plate to indicate the proper longitudinal position. In order to make this scale plate available for any style, it is preferably made adjustable in the direction of the punches.

Usually, when a vamp is presented between a cutting block and co-operating punch to receive ornamental perforations, it is out of sight of the operator and can not be safely or accurately positioned. In accordance with another feature of the invention, improved mechanism is provided by which the work is located while free and clear of the cutting block. As shown, the perforating die, vamp support and gauge arms are mounted to slide as a unit from a vamp locating position clear of the cutting block to a perforating position beneath the latter. To avoid interference with the punching mechanism by the gauge arms, the die is provided with a recess and the vamp supporting plate is provided with a depressible portion carrying the gauge arms which can yield into the recess under punching pressure. Preferably, and for economy of production, the vamp supporting plate is combined with the die stripper and the gauge arms are supported on this.

The term "vamp" has been used throughout the specification and claims merely for convenience and is intended to cover, where the prior art permits, not only vamps but wing tips and other work capable of being handled in a similar way.

Referring to the drawings,—

Fig. 2 is a vertical central section with a vamp in perforating position;

Fig. 3 is a perspective view of the die and locating mechanism with the gauge arms spread to their widest extent;

Fig. 4 is a top plan view showing in broken lines a circular vamp and an ordinary vamp applied to the locating mechanism, and Fig. 5 is an exploded view indicating how the parts are assembled.

Figure 1:
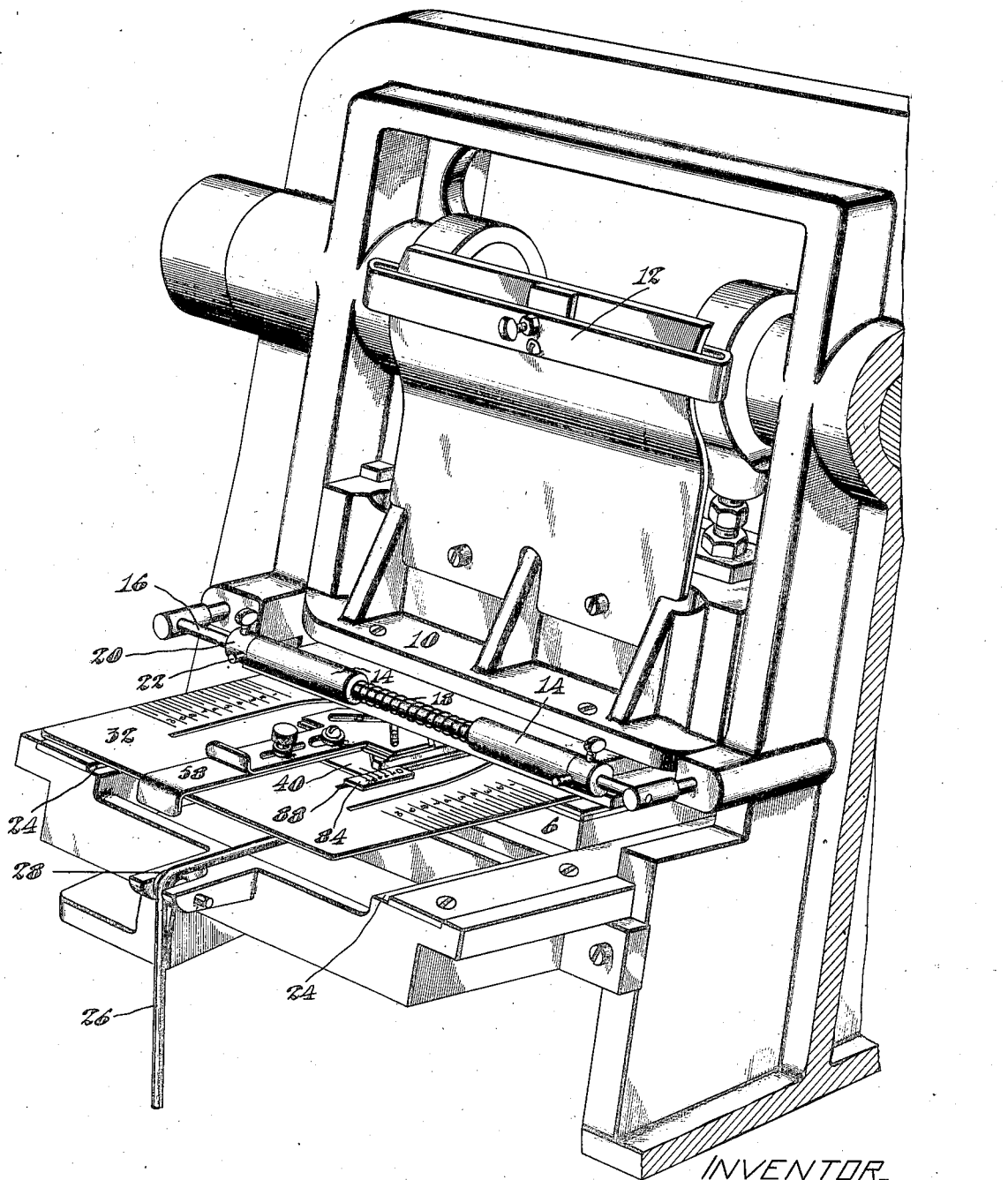
Fig. 1 is a perspective view of a perforating machine and a vamp locating mechanism in the position assumed when a vamp is about to be perforated.

In the illustrated machine, the vamps are initially positioned while the die and locating mechanism are free and clear of the cutting block. When the work is located, it is moved with the die to the position indicated in Fig. 2. To a die carrier 6 are secured the punch holding plates 8 having a series of punches arranged in the desired pattern. Above these, there is mounted for reciprocation in guideways in the frame a cutting block or plunger 10 which may be operated in any usual way, as by eccentric straps and eccentrics from the drive shaft. To protect the punches and insure clean cut perforations, a paper backing strip (not shown) may be led through the guide 12, around the rollers 14 and beneath the cutting block 10. The rollers 14 are sleeved upon a rod 16 fixed to the frame and are normally pressed apart by a coiled spring 18 surrounding the rod. At one end of each roller is an adjustable clamp collar 20 having edge guiding pins 22 which may be adjusted to engage the edges of the paper.

The die holder is movable out from under the cutting block along the inclined guideways 24 by means of a cable 26 passing over the pulley 28 to a suitable treadle (not shown). Its movement in the other direction is limited by a stop 30 extending downwardly from the die holder and abutting against a portion of the framework. To support the vamp and strip it from the punches following an impression, there is provided a combined vamp supporting plate and stripper 32 yieldingly secured to the punch holder and having a series of openings corresponding to the pattern of the die. Since the throat of a vamp, when in position for perforating, enters well in between the cutting block and die, a throat gauge, in the absence of provision to prevent it, would be injured by the descent of the cutting block. As shown, the die is provided with a recess and the vamp supporting plate 32 has U-shaped slots 34 and 36 forming a spring tongue or depressible portion 38 carrying the locating mechanism. Thus, when the cutting block descends upon the locating mechanism, the latter is free to yield into the recess.

In describing the vamp locating mechanism the toe end is regarded as the front. A gauge plate 40 is mounted for longitudinal adjustment on the tongue 38 and is guided at the front end (Fig. 2) by a downwardly extending stud or pin 42 which enters a longitudinal slot 44 in the plate 32. The gauge plate is secured in adjusted position by a clamp screw 46 and washers 48, said screw extending through a slot 50 into a tapped guide boss 52 on the gauge plate. This boss 52 and a similar one 54 serve as guides for a pair of superimposed sliding cam plates 56 and 70 which are slotted to embrace the guide bosses. The lower slide plate 56 is moved longitudinally by a shank extension 58 which has a downturned end for manipulation by the operator. Near the front of the lower slide plate 56 is a pair of inclined slots 60 forming cams which engage guide pins 62 extending upwardly from a pair of gauge arms 64 which enter the throat of the vamp. Movement of the slide plate 56 opens or closes the front ends of the gauge arms. The gauge arms are confined against longitudinal movement with respect to the gauge plate 40 by means of downward extensions of the pins 62 which enter a cross slot 66 in the gauge plate, this construction allowing opening and closing movement of the arms. Guide pins 68, near the rear ends of the gauge arms, extend upwardly through cut out portions of the slide plate 56 and enter inclined cam slots 74 in an upper slide plate 70 which is manipulated by the extended shank 72 and its upturned end portion. The movement of these sliding cam plates independently causes the gauge arms to open or close so that they can be made to fit the throat of any style or shape of vamp.

To retain the above described movable parts in the position to which they are adjusted, they are held frictionally by means of washers 76 and screws 78, said screws extending downwardly and being threaded into the upper parts of the two guide bosses 52 and 54. When the gauge arms are once set to conform to the shape of the vamp, they can then be moved simultaneously at both ends, if the sliding cam plates are secured together. This may be advantageously accomplished by a clamp screw 80 which extends through a slot in the shank 72 and is threaded in a boss on the shank 58. To indicate the longitudinal position of the gauge plate 40, it has an index line 90 for co-operating with a scale plate 84 graduated in sizes and secured adjustably in place by a clamp screw 86 extending upwardly through a longitudinal slot 88 in the vamp supporting plate. The sides of the vamp supporting plate have suitably numbered scales 92 for use in positioning circular vamps which usually contact with only the front ends of the gauge arms. When the throat of a vamp is of such shape that it will not conform readily to the outer sides of the gauge arms shown, the latter may be quickly detached and replaced by others of a more suitable shape. When another system of size measurement is used, the scale plate 84 may readily be replaced by a different one suitably graduated.

In the use of the apparatus a vamp is placed on the supporting plate 32 when the latter is withdrawn from the cutting block. Starting with size 4, for instance, of a given style, the gauge plate 40 is first moved to set the ornamental perforations at the desired distance from the throat and is secured by the clamp screw 46. Then the scale plate 84 is moved longitudinally until the scale line designating size 4 coincides with the index line 90 on the gauge plate. The front and rear ends of the gauge arm 64 are then moved independently until their outer edges conform exactly to the shape of the throat. Then, clamping the sliding plates together by means of the screw 80, the shape defined by the spaced gauge arms may be maintained while still leaving them free for opening and closing movement simultaneously to fit the different sizes progressively. When the next size is to be positioned, the gauge arms are spread simultaneously and the clamp screw 46 loosened to slide the gauge plate 40 and its index line 90 to the next size line on the scale plate 84. Thereafter the other sizes are operated upon in a similar way.

Although the invention has been shown and described in connection with a particular apparatus, it should be understood that it is not in any way limited to the illustrated construction.

Having thus described my invention, what I claim as new and desire to secure by Letters Patent of the United States is:

1. In a perforating machine, means for locating vamps comprising a vamp support, means to engage the throat of a vamp to center the same, slide plates supported by said throat engaging means, and means for sliding said plates to cause the throat engaging means to fit the throats of different vamps.

2. In a perforating machine, means for locating vamps comprising a vamp support, a pair of gauge arms to enter the throat of a vamp, slide plates mounted on the gauge arms, and means for sliding the plates to open or close the gauge arms to fit the throats of different vamps.

3. In a perforating machine, means for locating vamps comprising a vamp support, a pair of gauge arms to enter the throat of a vamp and mounted for relative angular movement, a plate supported on said arms for longitudinal movement, and means, actuated by the longitudinal movement of said plate, for causing relative angular movement of said arms in accordance with the shape of the throat of a vamp.

4. In a perforating machine, means for locating vamps comprising a vamp support, a pair of gauge arms each having a guide pin, a slide plate movable longitudinally of the arms and having cam slots engaging the pins, and means for moving the slide plate to cause the arms to approach or recede from one another at one end to fit the throat of a vamp.

5. In a perforating machine, means for locating vamps comprising a vamp support, a pair of gauge arms for engaging the throat of a vamp, a pair of plates movable longitudinally of the gauge arms, cam connections between each plate and the gauge arms, and means for moving the plates to vary the relative positions of the gauge arms.

6. In a perforating machine, means for locating vamps comprising a vamp support, a pair of gauge arms having guide pins, slide plates movable longitudinally of the arms and having cam slots engaging the pins, and means for moving the slide plates independently to cause the arms to fit the throats of different styles of vamps.

7. In a perforating machine, means for locating vamps comprising a vamp support, a pair of gauge arms for engaging the throat of a vamp, a pair of independently movable plates, each connected to the gauge arms near one end of the latter to control the amount of separation, and means for clamping the plates together for simultaneous movement to cause the arms to fit progressively vamps of different sizes.

8. In a perforating machine, means for locating vamps comprising a vamp support, a pair of gauge arms having guide pins, slide plates movable longitudinally of the arms and having cam slots engaging the pins, and means for securing the slide plates together for simultaneous movement to engage progressively vamps of different sizes.

9. In a perforating machine, means for locating vamps comprising a vamp support, a pair of gauge arms having guide pins, slide plates movable longitudinally of the arms and having cam slots engaging the pins, means for moving the slide plates independently to cause the arms to fit the throats of different styles of vamps, and means for securing the slide plates together for simultaneous movement to engage progressively vamps of different sizes.

10. In a perforating machine, means for locating vamps comprising a vamp support, a pair of gauge arms having front and rear sets of guide pins, superposed plates movable longitudinally of the arms and having cam slots engaging the pins, the lower one of said plates being cut out to allow one set of pins to have movement independently of said lower plate, and means for moving the upper plate to actuate the gauge arms at one end.

11. In a perforating machine, means for locating vamps comprising a gauge plate having guide bosses, a pair of gauge arms mounted to open and close on said gauge plate, slide plates having slots for guided movement longitudinally on the guide bosses, and connections between the slide plates and the gauge arms to open and close the latter upon longitudinal movement of the slide plates.

12. In a perforating machine, means for locating vamps comprising a gauge plate having a transverse slot and guide bosses, gauge arms having pins entering said transverse slot to retain the arms against longitudinal movement relatively to the gauge plate, guide pins carried by said gauge arms, slide plates having guide slots engaging said guide bosses and having cam slots engaging said guide pins, and means for moving the slide plates to separate or bring together the gauge arms.

13. In a perforating machine, in combination, a vamp support, vamp perforating means, a gauge plate, gauge arms movable on the gauge plate to fit the throat of a vamp, means for simultaneously moving both ends of the gauge arms to fit progressively vamps of different sizes, and means for adjusting the gauge plate relatively to the perforating means in accordance with said sizes.

14. In a perforating machine, in combination, a vamp supporting plate, a perforating die, a gauge plate slidable longitudinally on the supporting plate and having vamp positioning means, a size scale secured to the supporting plate for co-operation with an index on the gauge plate, means for clamping the gauge plate in adjusted positions corresponding to the different sizes of vamps, and means for adjusting the scale to adapt it for use with different styles of vamps.

15. In a perforating machine, in combination, a vamp support, vamp perforating means, a gauge plate, gauge arms carried by the gauge plate, means for moving said gauge arms laterally and angularly to fit any shape or size of vamp throat, means for adjusting said gauge plate to an initial position in accordance with the style of perforating, a size scale, and means for securing said scale in an initial position corresponding to the size of the vamp.

16. In a perforating machine, a cutting block, a punch plate having a recess, a vamp supporting plate having a depressible cut-out portion, and a vamp gauge carried by said depressible portion and arranged to yield into said recess under punching pressure.

17. In a perforating machine, a cutting block, a die, a combined vamp support and stripper plate secured to said die, and a vamp gauge carried by said plate to position a vamp with respect to said die.

18. In a perforating machine, a cutting block, a die, a stripper plate secured to said die, a gauge secured to the stripper plate for engaging the throat of a vamp, and means for carrying the die with its stripper plate and gauge from a vamp locating position free and clear of the cutting block to a vamp perforating position.

19. In a perforating machine, a cutting block and a perforating die arranged for relative movement toward and from each other to perform a perforating operation, a guideway for guiding one of said members in another direction for carrying a vamp from a locating position to a perforating position, a pair of gauge arms carried by said member, and means for opening and closing said arms at both ends to cause them to fit the throat of a vamp.

20. In a perforating machine, a frame, a cutting block mounted to reciprocate in the frame, a guideway, a die mounted to slide on the guideway from a position free and clear of the cutting block to an operative position with respect to said cutting block, a vamp supporting plate carried by said die, a throat gauge having a pair of arms to enter the throat of a vamp, and means for moving the gauge arms at both ends to cause them to locate the vamp.

In testimony whereof I have signed my name to this specification.

GEORGE KNIGHT.